United States Patent
Uchida

(10) Patent No.: US 11,843,731 B2
(45) Date of Patent: Dec. 12, 2023

(54) INFORMATION PROCESSING APPARATUS INSTRUCTS FAX APPARATUS ON A CHAT SERVICE CHANNEL TO TRANSMIT IMAGE DATA TO A DESTINATION, NON-TRANSITORY STORAGE MEDIUM, AND CONTROL METHOD

(71) Applicant: CANON KABUSHIKI KAISHA, Tokyo (JP)

(72) Inventor: Tomoki Uchida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/061,192

(22) Filed: Dec. 2, 2022

(65) Prior Publication Data
US 2023/0179715 A1 Jun. 8, 2023

(30) Foreign Application Priority Data

Dec. 8, 2021 (JP) ................................ 2021-199143

(51) Int. Cl.
*H04N 1/00* (2006.01)
*H04N 1/333* (2006.01)
*H04L 67/00* (2022.01)

(52) U.S. Cl.
CPC ....... *H04N 1/0022* (2013.01); *H04N 1/00307* (2013.01); *H04N 1/00408* (2013.01); *H04L 67/00* (2013.01); *H04N 1/33338* (2013.01); *H04N 2201/0094* (2013.01)

(58) Field of Classification Search
None
See application file for complete search history.

(56) References Cited

U.S. PATENT DOCUMENTS

| 11,630,625 | B2* | 4/2023 | Kitahara | ................. H04L 51/04 |
| | | | | 358/1.15 |
| 2011/0051179 | A1* | 3/2011 | Iga | ..................... H04N 1/32096 |
| | | | | 358/1.15 |
| 2015/0092233 | A1* | 4/2015 | Park | .................... H04N 1/00244 |
| | | | | 358/1.15 |
| 2018/0103160 | A1* | 4/2018 | Sugita | ................. H04N 1/00925 |
| 2021/0120144 | A1* | 4/2021 | Takahashi | .......... H04N 1/32128 |

FOREIGN PATENT DOCUMENTS

JP 2019169927 A 10/2019

* cited by examiner

*Primary Examiner* — Haris Sabah
(74) *Attorney, Agent, or Firm* — Canon U.S.A., Inc. IP Division

(57) ABSTRACT

An information processing apparatus communicates with a fax apparatus and provides a chat service. The information processing apparatus includes an acceptance unit that accepts an execution instruction on a channel of the chat service from a user and a transmission unit that transmits, based on acceptance of the execution instruction by the acceptance unit, to the fax apparatus, an instruction for the fax apparatus to transmit image data uploaded to the channel of the chat service to a transmission destination and the image data.

15 Claims, 17 Drawing Sheets

FIG.10

| MFP NAME | LINE | LINE TELEPHONE NUMBER | SENDER NAME |
|---|---|---|---|
| MFP-A | 1 | 03-1234-xxxx | XX Ltd. Sales Dept. |
| MFP-B | 1 | 03-1234-yyyy | XX Ltd. Purchase Dept. |
| MFP-B | 2 | 03-1234-zzzz | XX Ltd. Public Relations Dept. |
| ... | ... | ... | ... |

INFORMATION PROCESSING APPARATUS INSTRUCTS FAX APPARATUS ON A CHAT SERVICE CHANNEL TO TRANSMIT IMAGE DATA TO A DESTINATION, NON-TRANSITORY STORAGE MEDIUM, AND CONTROL METHOD

BACKGROUND

Field

The present disclosure relates to an information processing apparatus, a storage medium, and a control method.

Description of the Related Art

Japanese Patent Application Laid-Open No. 2019-169927 discusses a function called PCFAX for transmitting image data stored on a personal computer (PC) and a facsimile (fax) transmission instruction to a fax apparatus.

In recent years, there has also been a chat service for a plurality of users to exchange messages where image data is uploaded, and the uploaded image data is shared by the plurality of users of the chat service.

For example, to transmit image data uploaded into a talk room of the chat service to a transmission destination using the PCFAX function, it is necessary to download the image data from the chat service to the PC, which is time-consuming for a user.

SUMMARY

Aspects of the present disclosure is directed to reducing work of a user in transmitting image data uploaded to a talk room of a chat service to a transmission destination using a PCFAX function.

According to an aspect of the present invention, an information processing apparatus that communicates with a fax apparatus and provides a chat service includes an acceptance unit configured to accept an execution instruction on a channel of the chat service, and a transmission unit configured to, based on acceptance of the execution instruction by the acceptance unit, transmit, to the fax apparatus, an instruction for the fax apparatus to transmit image data uploaded to the channel of the chat service to a transmission destination and the image data.

Further features of the present disclosure will become apparent from the following description of exemplary embodiments with reference to the attached drawings.

BRIEF DESCRIPTION OF THE DRAWINGS

FIG. 10 is a diagram illustrating an example of information about an MFP registered in the intermediate server.

DESCRIPTION OF THE EMBODIMENTS

Exemplary embodiments of the present disclosure will be described below with reference to the drawings. The scope of the disclosure is not limited to configurations described in the exemplary embodiments. Some or all of the configurations can be replaced with equivalents if an effect similar to an intended effect can be obtained.

<System Configuration>

Figure 1:
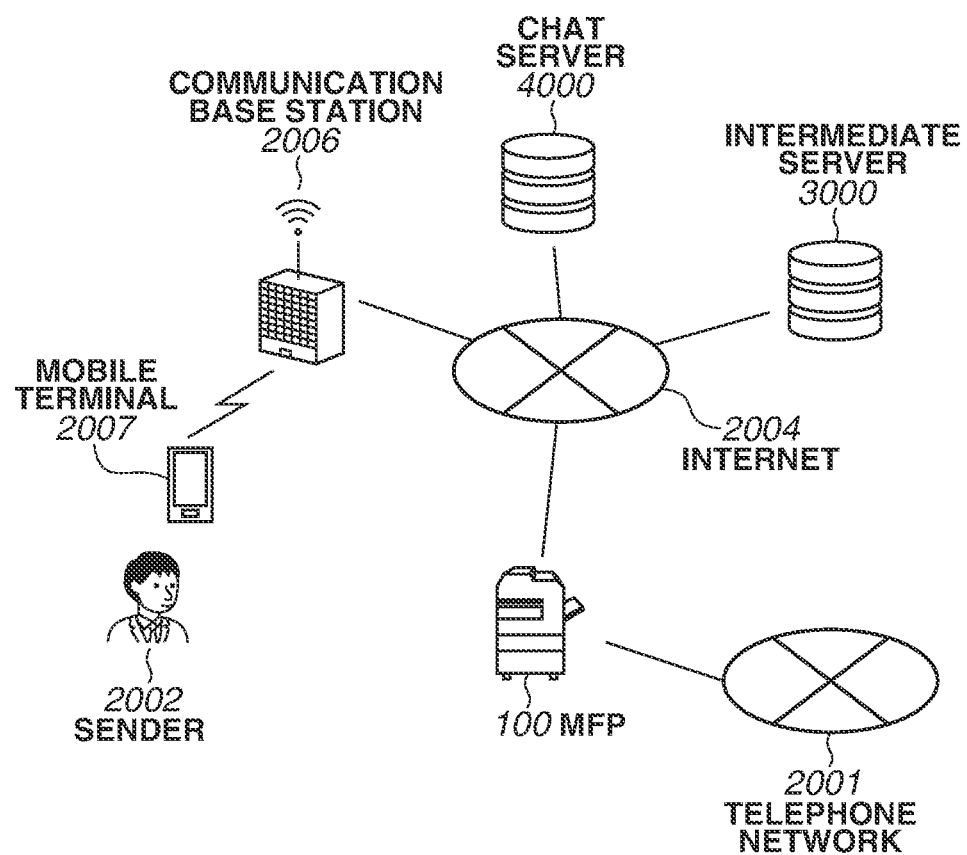
FIG. 1 is a schematic diagram illustrating an example of a system configuration.

FIG. 1 is a diagram illustrating an example of a system configuration according to an exemplary embodiment. In this system configuration, a multi-function peripheral (MFP) 100 is connected to a telephone network 2001, and the MFP 100, an intermediate server 3000, a chat server 4000, and a communication base station 2006 communicating with a mobile terminal 2007 are communicatively connected to each other. Each of these devices are respectively connected to the Internet 2004.

When a sender 2002 selects a document in a chat application on the mobile terminal 2007 and starts fax transmission processing, the processing proceeds in interaction with the chat server 4000. An instruction to execute PCFAX is provided to the MFP 100 via the intermediate server 3000 as a result of this processing.

<Hardware Configuration of MFP>

Figure 2:
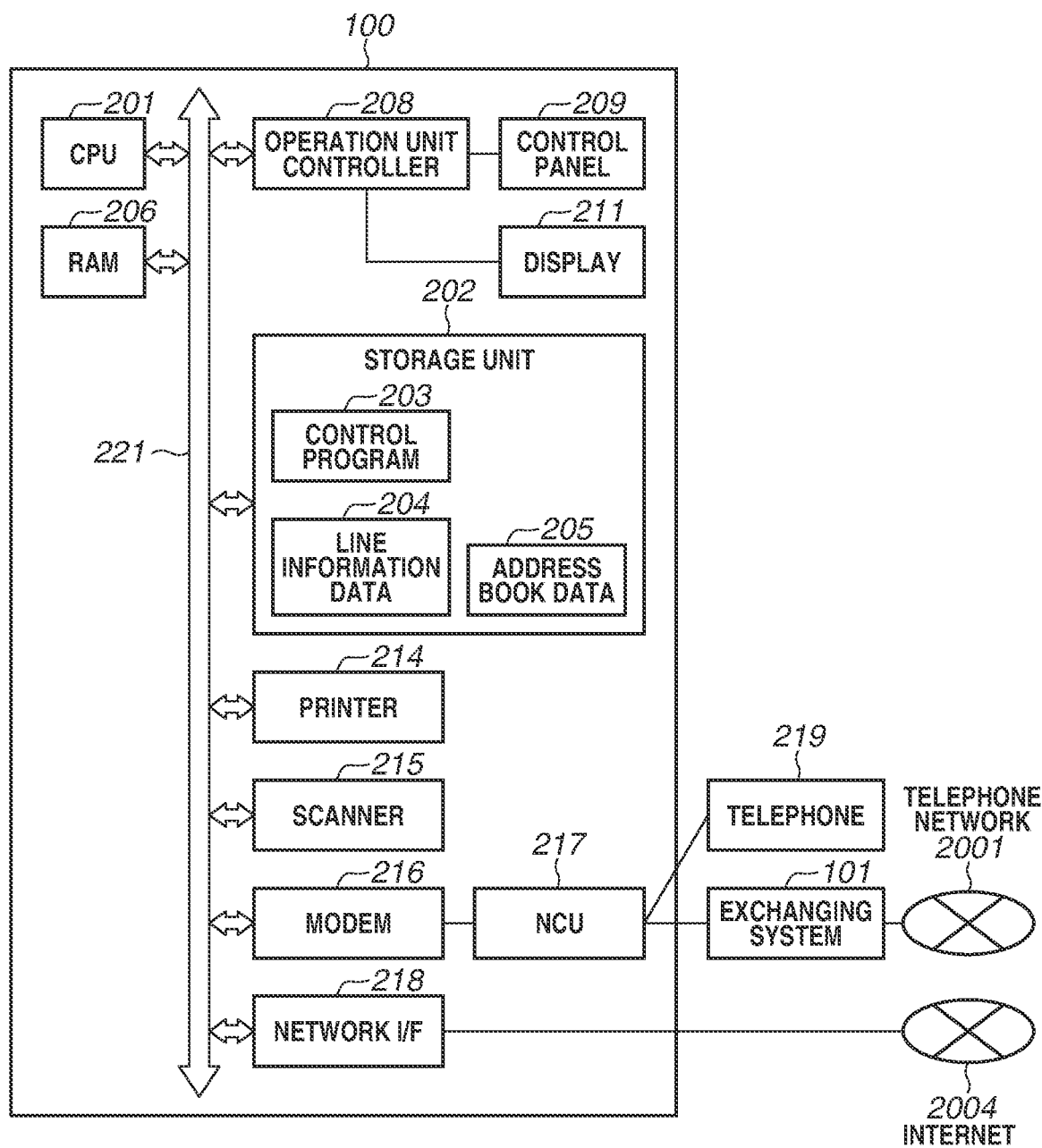
FIG. 2 is a block diagram illustrating an example a hardware configuration of a multi-function peripheral (MFP).

FIG. 2 illustrates an example of a hardware configuration of the MFP 100. The MFP 100 serves as a fax apparatus and/or an image processing apparatus according to the present exemplary embodiment.

A central processing unit (CPU) 201 reads out and executes a control program 203 stored in a storage unit 202 (e.g., a storage device such as a hard disk drive (HDD), a solid state drive (SSD), or a read only memory (ROM)). The CPU 201 controls each device connected to a system bus 221.

Line information data 204 stored in the storage unit 202 includes line information data, such as a telephone number and a sender name, for each telephone line.

Address book data 205 is address book data stored in the storage unit 202, and includes telephone numbers for fax communication and e-mail addresses to be used for e-mail communication.

The storage unit 202 is also used as a temporary storage area for image data in some cases. The image data is typically stored in a random access memory (RAM) 206.

An operation unit controller 208 controls, for example, various buttons, a control panel 209, or a display 211 of the MFP 100. The control panel 209 is a touch panel for accepting touch instructions from a user, while the display 211 displays a screen based on screen data. In the present exemplary embodiment, the control panel 209 and the display 211 are described as separate units. In another exemplary embodiment, they can be provided as a single unit.

A printer 214 is a printing unit that prints an image on a sheet using, for example, an electrophotographic method. In addition to using an electrophotographic method, an ink-jet method can also be used as the printing method.

A scanner 215 is a reading unit for reading an image printed on paper. An automatic document feeder (ADF) (not illustrated) is attached to the scanner 215 so that the scanner 215 can also automatically read a plurality of original documents. The scanner 215 can also read an image of an original document by scanning an original document placed on a platen glass (not illustrated) of the MFP 100.

A modulator-demodulator (modem) 216 demodulates a modulated signal received from the telephone network 2001 via an exchanging system 101. In addition, the modem 216 modulates a signal generated by the MFP 100 and transmits the modulated signal to the exchanging system 101.

A network control unit (NCU) 217 in the present exemplary embodiment is an interface between a telephone line and a fax. The NCU 217 performs line control, such as detecting a signal from the exchanging system 101, to transfer the detected signal to the modem 216, and switching the line to a telephone 219.

A network interface (I/F) 218 is a communication unit for performing network communication by connecting to the Internet 2004. The network I/F 218 can be a communication unit for wired connection such as Ethernet®, or a communication unit for wireless connection such as wireless fidelity (Wi-Fi®). The network I/F 218 can include a plurality of communication units to perform communications by both wired connection and wireless connection.

<Hardware Configuration of Intermediate Server>

Figure 3:
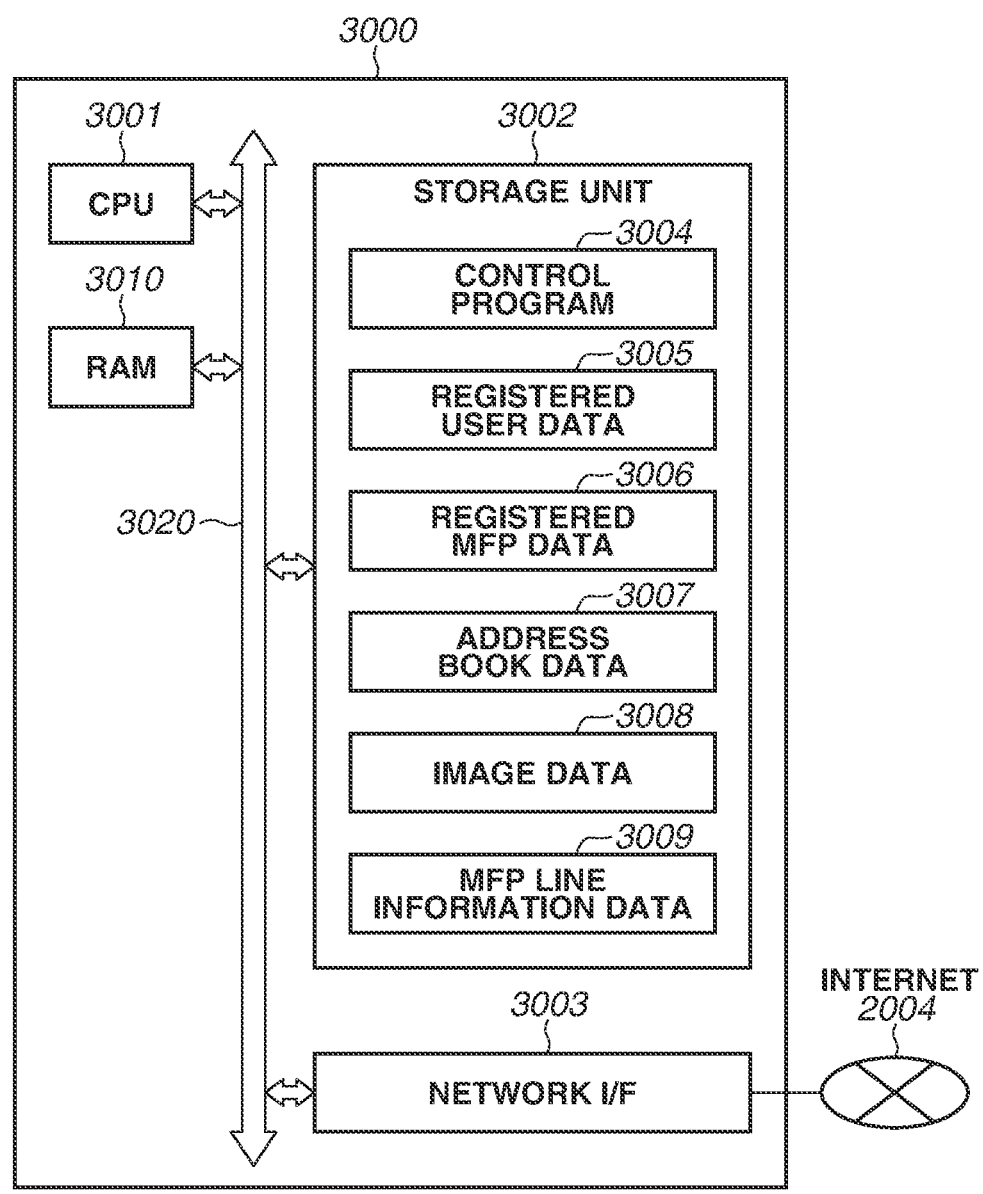
FIG. 3 is a block diagram illustrating an example of a hardware configuration of an intermediate server.

FIG. 3 is a block diagram illustrating an example of a hardware configuration of the intermediate server 3000 according to the present exemplary embodiment. The intermediate server 3000 includes a CPU 3001, a RAM 3010, a storage unit 3002, and a network I/F 3003.

The CPU 3001 reads out and executes a control program 3004 stored in the storage unit 3002, such as an HDD, a SSD, or a ROM. The CPU 3001 controls each device connected to a system bus 3020.

The storage unit 3002 stores the control program 3004, registered user data 3005, registered MFP data 3006, address book data 3007, image data 3008, and MFP line information data 3009.

The registered user data 3005 is data representing a list of users who can carry out PCFAX from the chat server 4000 via the intermediate server 3000. The registered MFP data 3006 is data representing a list of MFPs registered beforehand in the intermediate server 3000. The address book data 3007 is the address book data 205 acquired from the MFP 100 by the intermediate server 3000. The image data 3008 is fax data received from the chat server 4000. The MFP line information data 3009 is line information (including a telephone number and a sender name) for each line acquired from the MFP 100.

The network I/F 3003 is a communication unit for connecting to the Internet 2004 to perform network communication. The network I/F 3003 can be a communication unit for wired connection such as Ethernet®, or a communication unit for wireless connection such as Wi-Fi®. The network I/F 3003 can include a plurality of communication units to perform communications by both wired connection and wireless connection.

<Hardware Configuration of Chat Server>

Figure 4:
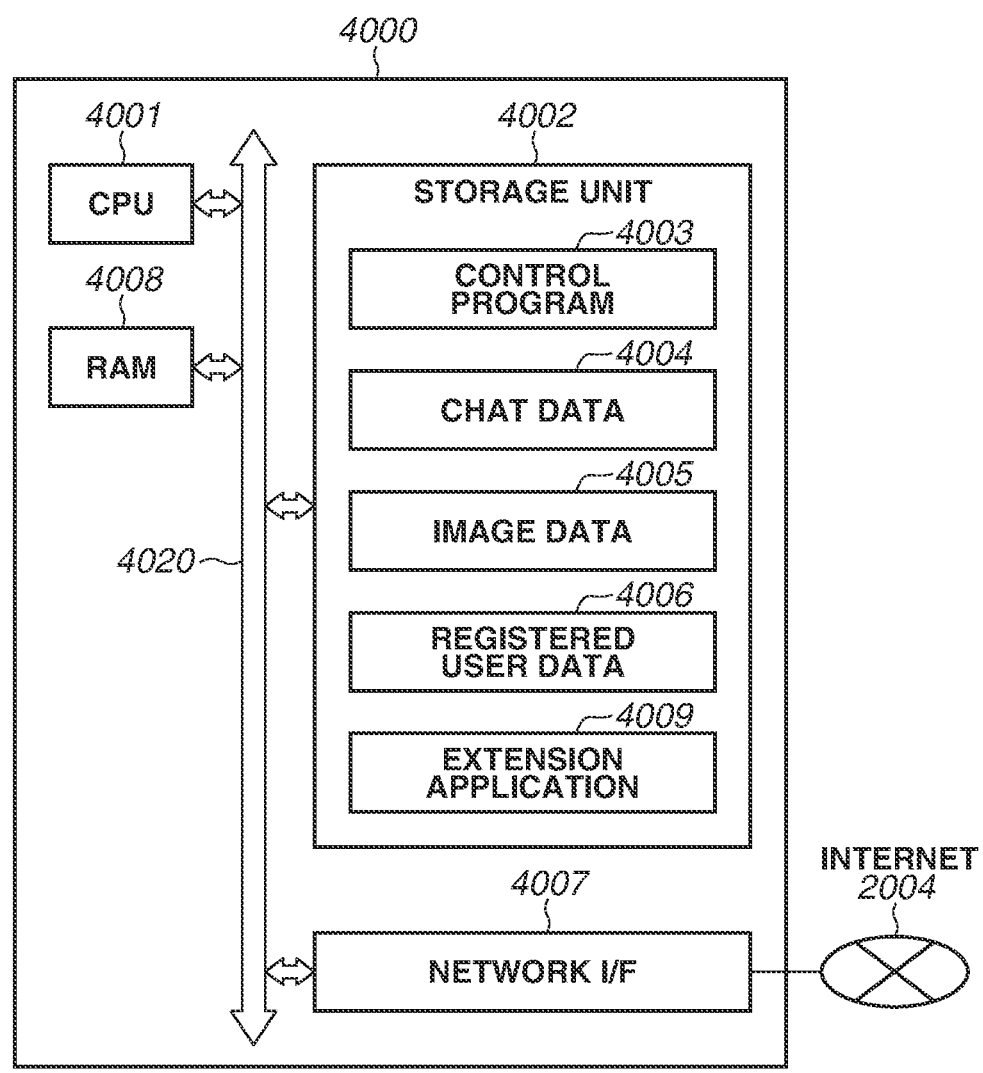
FIG. 4 is a block diagram illustrating an example of a hardware configuration of a chat server.

FIG. 4 is a block diagram illustrating an example of a hardware configuration of the chat server 4000 according to the present exemplary embodiment.

The chat server 4000, which serves as an information processing apparatus in the present exemplary embodiment, includes a CPU 4001, a RAM 4008, a storage unit 4002, and a network I/F 4007.

The CPU 4001 reads out and executes a control program 4003 stored in the storage unit 4002, such as an HDD, a SSD, or a ROM. The CPU 4001 controls each device connected to a system bus 4020.

The CPU 4001 accepts a message posting request from a chat application installed on the mobile terminal 2007, and then posts received messages to a designated chat room.

The storage unit 4002 stores chat data 4004, image data 4005 that has been posted, and an extension application 4009.

The chat data 4004 is data indicating each message posted in a chat service, and is stored in association with each chat room and a posting user.

The extension application 4009 is an application installed on the chat server 4000 and is also an application for transmitting a PCFAX instruction from the chat server 4000 to the MFP 100. The extension application 4009 can also have a function to transmit a print instruction or a scan instruction to the MFP 100.

The network I/F 4007 is a communication unit for connecting to the Internet 2004 to perform network communication. The network I/F 4007 can be a communication unit for wired connection such as Ethernet®, or a communication unit for wireless connection such as Wi-Fi®. The network I/F 4007 can include a plurality of communication units to perform communications by both wired connection and wireless connection.

The chat service will now be described. The chat service provided by the chat server 4000 serves a chat room for a plurality of users to exchange files, such as a messages and image data. A chat room can have various names according to the service, such as a channel, a talk, a team, a group, a talk room, or a group chat. The chat room is associated with a plurality of users beforehand.

Figure 5:
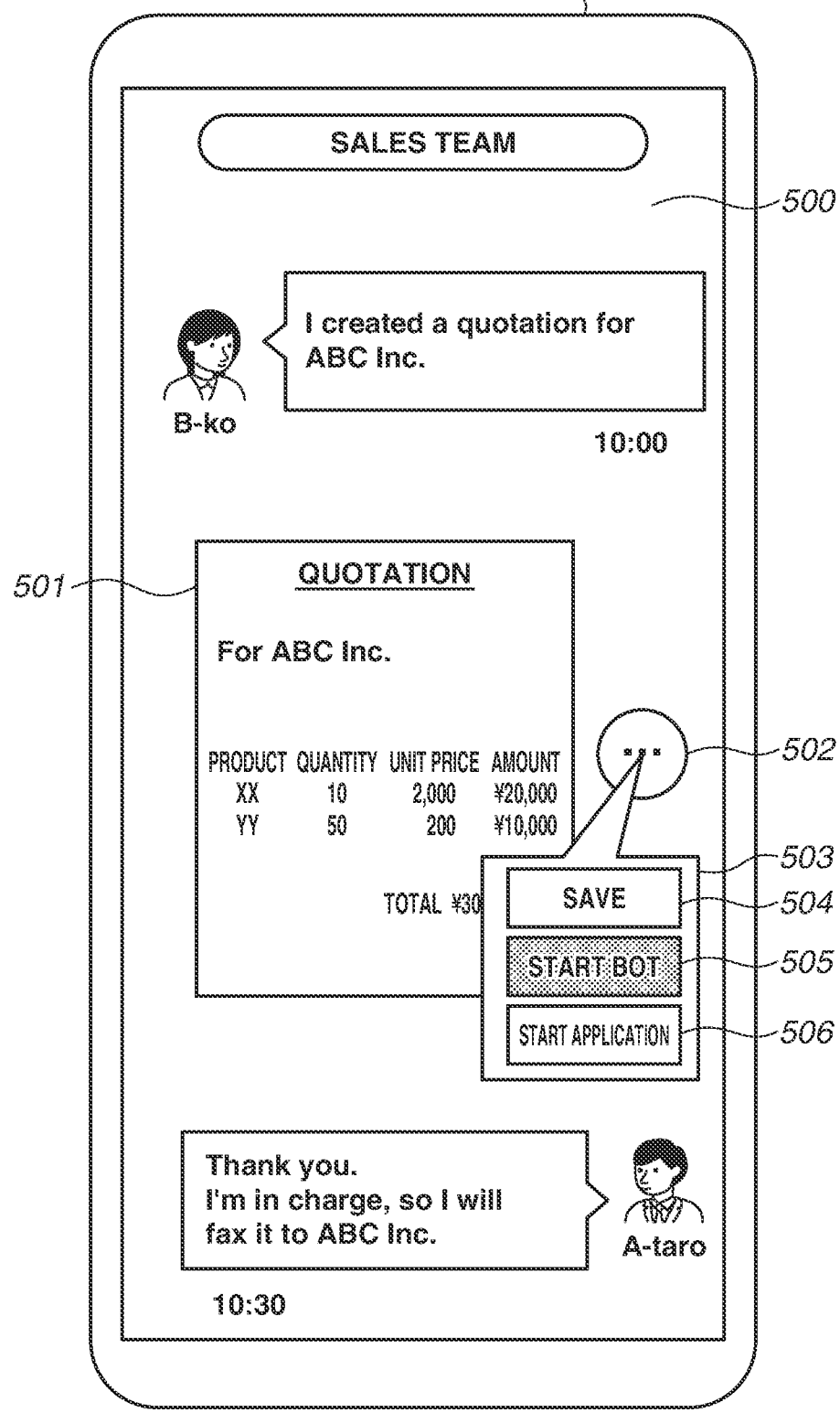
FIG. 5 is a diagram illustrating an example of a chat room screen displayed on a mobile terminal.

For example, as illustrated in FIG. 5, which is described in more detail below, a plurality of users including user "A-taro" and user "B-ko" participate in a chat room identified as "sales team". Messages and files posted to this chat room can be viewed only by the users (e.g., user "A-taro" and user "B-ko") participating in the chat room.

FIG. 5 illustrates an example of a chat room screen displayed on the mobile terminal 2007. The mobile terminal 2007 has an operation unit (a user interface) including a touch panel and a display. A chat room screen 500 is displayed on the operation unit. A user selects a chat room of "sales team" in a chat room selection screen (not illustrated), which results in the chat room screen 500 being displayed. The chat room screen 500 is displayed based on information about the chat room received from the chat server 4000 by the chat application installed on the mobile terminal 2007.

In the chat room screen 500, user "B-ko" participating in the sales team posts a message "I created a quotation for ABC Inc." and uploads a file 501, which results in the message and file 501 being displayed in the chat room screen 500. User "B-ko" posts the message and uploads the file 501 using, for example, a mobile terminal or personal computer (PC). However, any method of posting that would enable practice of the present exemplary embodiment is applicable. Also in the chat room screen 500, user "A-taro" posts a message "Thank you. I'm in charge, so I will fax it to ABC Inc.". Upon launching the chat application, user "A-taro" inputs the message in a message entry field (not illustrated) and provides an instruction to post the message using the mobile terminal 2007, so that this message is displayed in the chat room screen 500.

Conventionally, to transmit the file 501 via fax, the user downloads the file 501 to the mobile terminal 2007, activates a PCFAX driver, and then transmits the file 501 and a transmission instruction to the MFP 100. This process is time-consuming for the user. Therefore, in the present exemplary embodiment, the below-described processing is executed, which results in the work of the user being reduced in a case where PCFAX is carried out for a file uploaded to a chat room.

Turning back to FIG. 5, in the chat room screen 500, button 502 enables selecting processing for the file 501. A menu screen 503 is displayed by selecting the button 502, which in turn enables the processing for selecting the file 501. A save button 504, a start bot button 505, and a start application button 506 are provided. When the save button 504 is selected, the file 501 is downloaded and stored into a storage unit of the mobile terminal 2007.

When the start bot button 505 is selected, a chat bot function provided by the extension application 4009 is executed. This will be specifically described with reference to a chat room screen 600 in FIG. 6.

Figure 6:
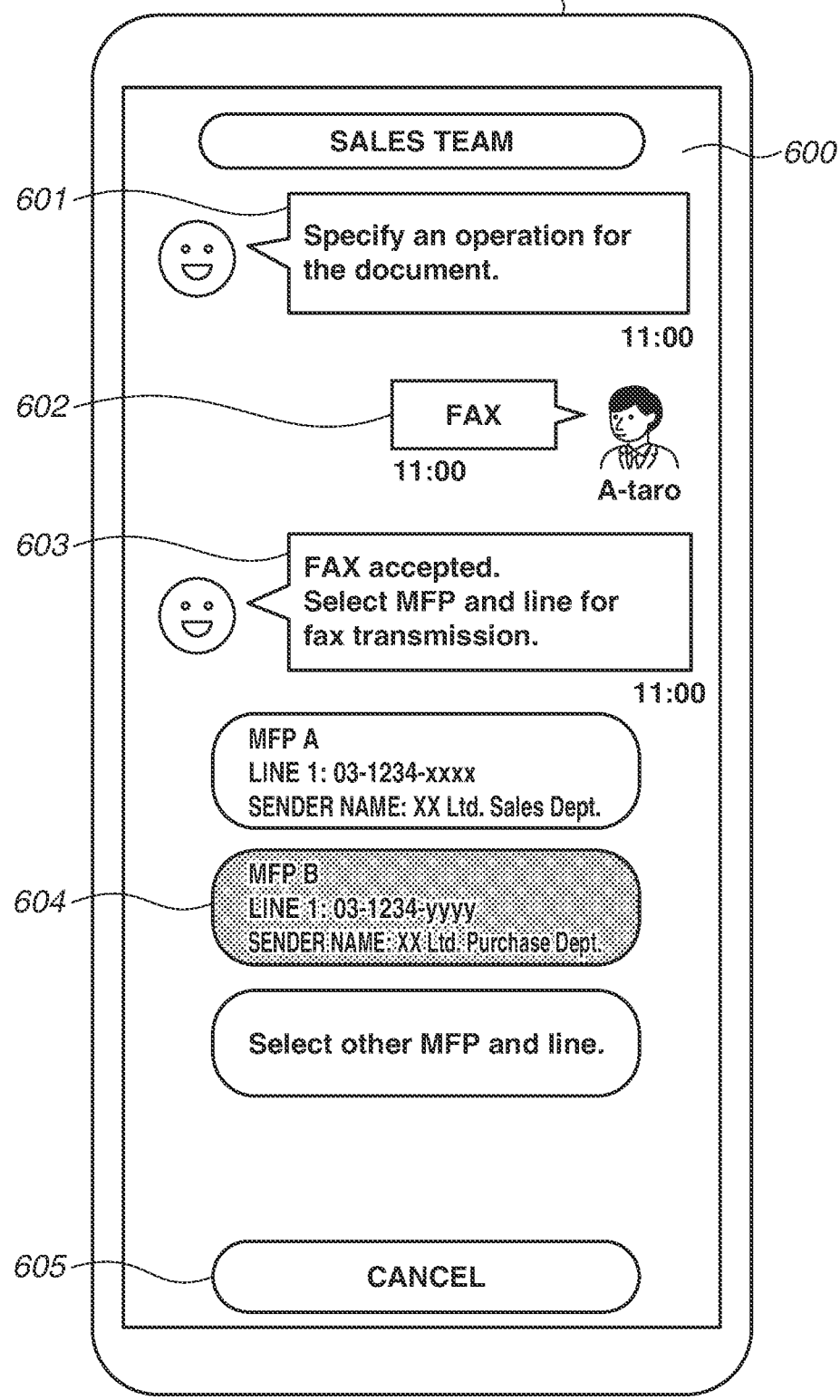
FIG. 6 is a diagram illustrating an example of a chat room screen.

FIG. 6 is a diagram illustrating an example of the chat room screen 600. If the start bot button 505 in the menu screen 503 in FIG. 5 is selected, a chat bot displays a message 601 "Specify an operation for the document". The message 601 is a message for asking the user what processing is to be performed for the file.

In response to the message 601, user "A-taro" returns a message 602 indicating "FAX". In response to the message 602, the chat bot displays a message 603 indicating the corresponding FAX was accepted and prompting the user to select an MFP and line for transmission and displays an object for selecting an MFP and a line to be used for fax transmission. The chat bot can interpret the content of an operation instruction, such as the message 602, from the user.

Figure 7:
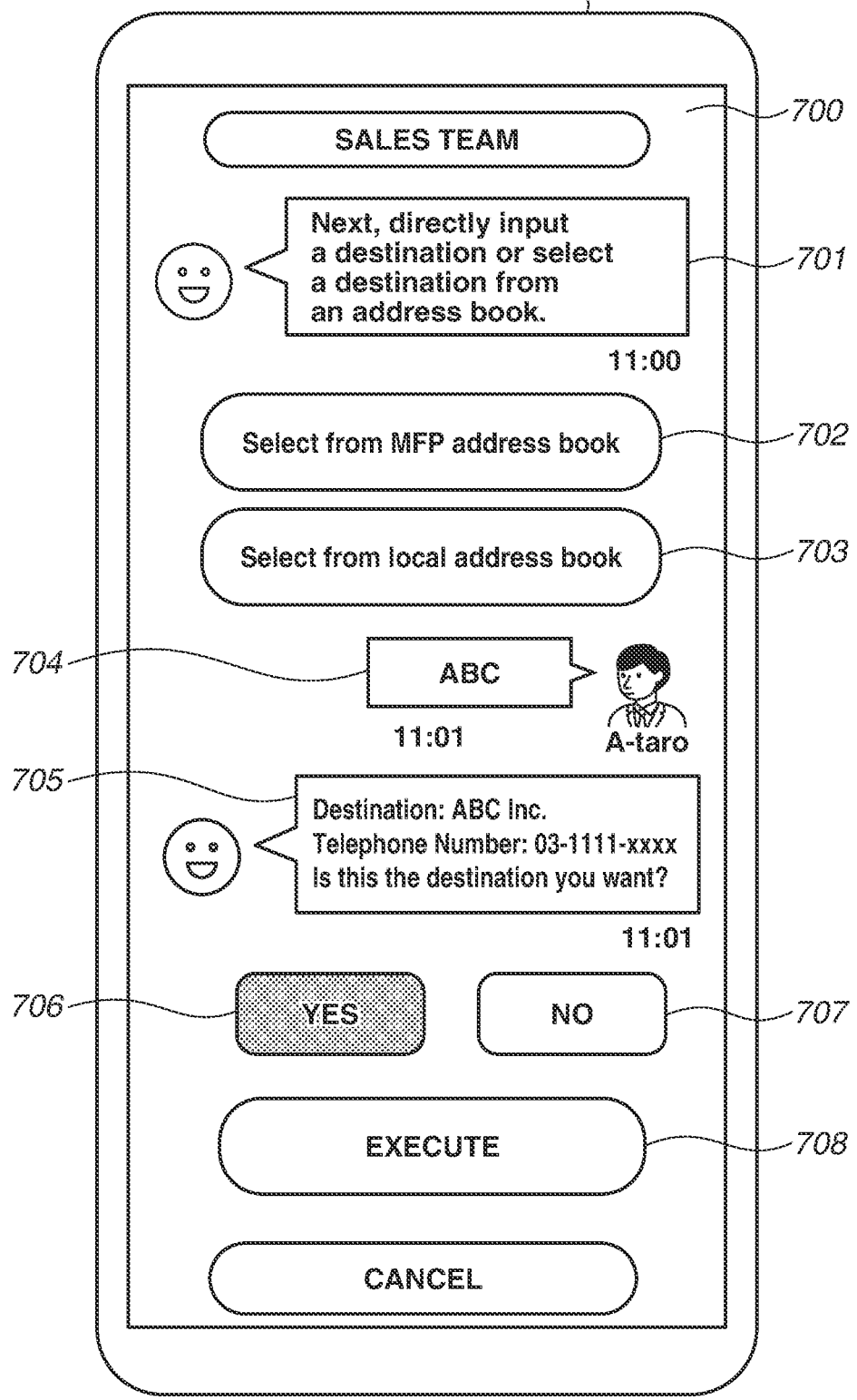
FIG. 7 is a diagram illustrating an example of a chat room screen.

If a button 604 is selected by the user, a line 1 of an MFP B is selected. In addition, a chat room screen 700 in FIG. 7 is displayed when the button 604 is selected. After the MFP and the line to be used are selected, an object for setting transmission settings (e.g., a transmission method (such as G3) and a resolution) to be used in the fax transmission processing is displayed (not illustrated). The user can set the transmission settings by selecting the object. The CPU 4001 then stores the setting values into the RAM 4008 so that the extension application 4009 can refer to the setting values. When a button 605 is selected, the processing for accepting the setting for PCFAX ends.

FIG. 7 is a diagram illustrating an example of the chat room screen 700. In the chat room screen 700, a message 701 prompting the user to set a destination for the image data is displayed. More specifically, the user is prompted to either directly input a destination (704) or to select a destination from an address book (button 702 and button 703). The buttons 702 and 703 are displayed by the chat bot of the extension application 4009. When the button 702 is selected, an address book of the MFP 100 is displayed (not illustrated) based on the address book data received from the MFP 100 by the chat server 4000, and selection of a telephone number is accepted by the user. When the button 703 is selected, an address book stored in the mobile terminal 2007 is displayed (not illustrated), and selection of a telephone number is accepted by the user.

In message 704, the user posts a character string to the chat room (to the channel) and destination information corresponding to the character string is obtained from the address book of the MFP 100 or the address book of the mobile terminal 2007. As illustrated in FIG. 7, the user posts a character string "ABC", so the destination information "ABC Inc." is acquired and displayed. In message 705, the chat bot confirms the acquired destination information. In a case where there is a plurality of valid destination candidates corresponding to a keyword, all the candidates can be displayed to be selected by the user. The user can directly post a telephone number to the chat room, and the chat bot can set the posted telephone number as the transmission destination.

If the user selects a button 706, the telephone number displayed in the message 705 is set as the transmission destination. When a button 707 is selected, processing for setting the transmission destination is canceled.

When a button 708 is selected, PCFAX processing is executed using the above-described set parameters. This processing is described in more detail below with reference to a sequence diagram illustrated in FIG. 12.

Figure 8:
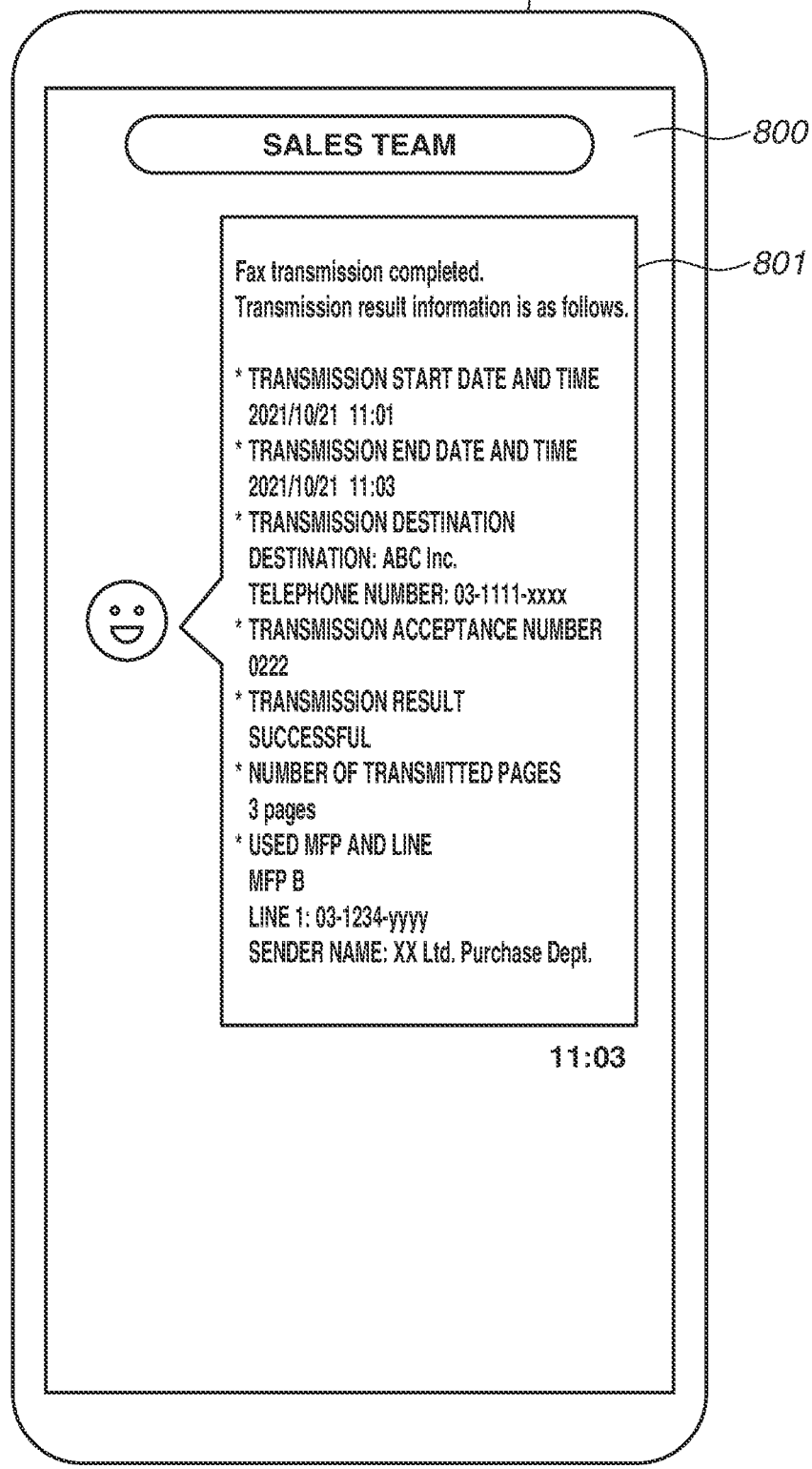
FIG. 8 is a diagram illustrating an example of a chat room screen.

FIG. 8 is a diagram illustrating an example of a chat room screen 800. After the PCFAX processing is executed, the fax transmission by the MFP 100 is completed, the chat server 4000 receives an execution completion notification from the MFP 100, and a message 801 is displayed in the chat room screen 800. More specifically, after the MFP 100 transmits the image data to the transmission destination, the chat bot of the extension application 4009 posts the message 801 to the chat room (the channel) without receiving an instruction from the user. The example in FIG. 8 illustrates the chat room (the channel) to which the message 801 is posted where the PCFAX execution instruction from the user has been accepted. In other words, completion of the fax transmission by the MFP 100 results in automatic posting of the message 801 to the chat room in which the execution instruction has been accepted.

In the message 801, information indicating the transmission result of the fax transmission is displayed. More specifically, the message 801 includes "transmission start date and time", "transmission end date and time", "transmission destination", "transmission acceptance number", "transmission result", "number of transmitted pages", and "used MFP and line".

<MFP Data Registered in Intermediate Server>

Figure 9:
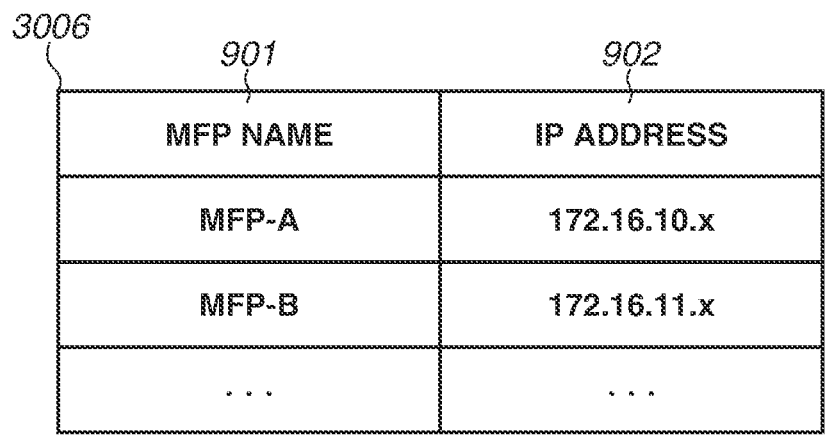
FIG. 9 is a diagram illustrating an example of information about an MFP registered in the intermediate server.

FIG. 9 is a diagram illustrating an example of information about an MFP registered in the intermediate server 3000. The registered MFP data 3006 is a list of MFPs that are possible transmission destinations of a PCFAX instruction.

The registered MFP data 3006 includes an MFP name 901 and an Internet Protocol (IP) address 902, which are registered in association with each other.

FIG. 10 is a diagram illustrating an example of information about an MFP registered in the intermediate server 3000. The MFP line information data 3009 is a list of information for each line of an MFP that is a possible transmission destination of a PCFAX instruction. The MFP line information data 3009 includes an MFP name 1001, a line 1002, a line telephone number 1003, and a sender name 1004, which are registered in association with each other.

[Preprocessing]

Figure 11:
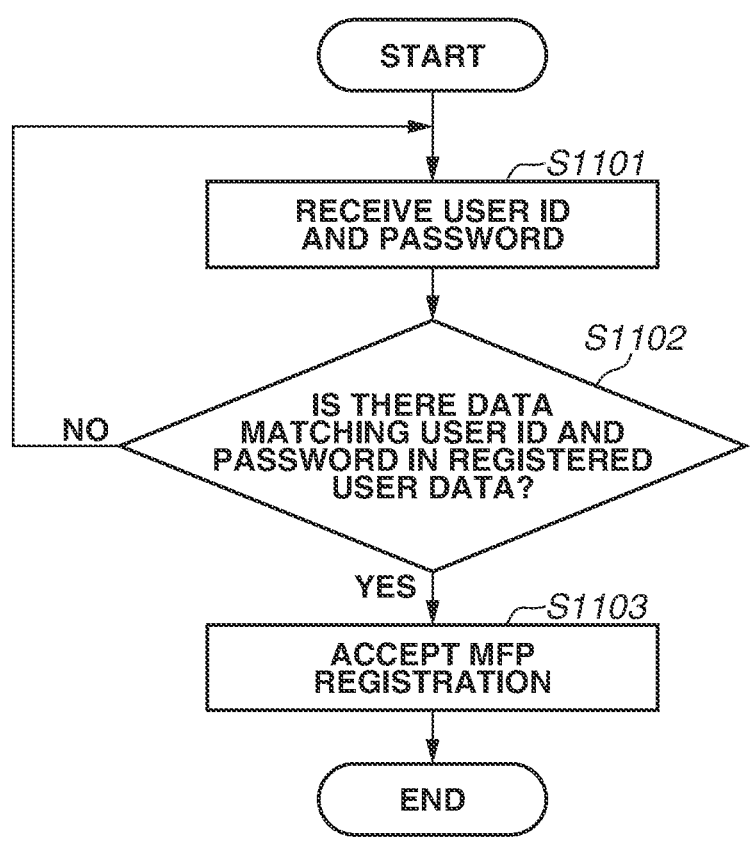
FIG. 11 is a flowchart illustrating an example of preprocessing for registering an MFP in the intermediate server.

FIG. 11 is a flowchart illustrating an example of preprocessing for registering an MFP in the intermediate server 3000. The user can access the intermediate server 3000 via Hypertext Transfer Protocol (HTTP) communication using a web browser of a PC, the mobile terminal 2007, or the like to start the processing.

In step S1101, when access is from the mobile terminal 2007, the CPU 3001 transmits information representing an input screen for inputting a user ID and a password to the mobile terminal 2007, and receives a user ID and a password input in the input screen (not illustrated) displayed on the mobile terminal 2007.

In step S1102, the CPU 3001 determines whether there is data matching the received user ID and password in the registered user data 3005. In a case where there is matching data (YES in step S1102), the processing proceeds to step S1103. In a case where there is no matching data (NO in step S1102), the processing returns to step S1101.

In step S1103, the CPU 3001 displays an input screen (not illustrated) for inputting an MFP name and an IP address to accept inputs. The number of MFPs that can be input can be greater than or equal to one. The input values are registered in the registered MFP data 3006. The MFP line information can also be input.

[Main Processing Sequence]

Figure 12:
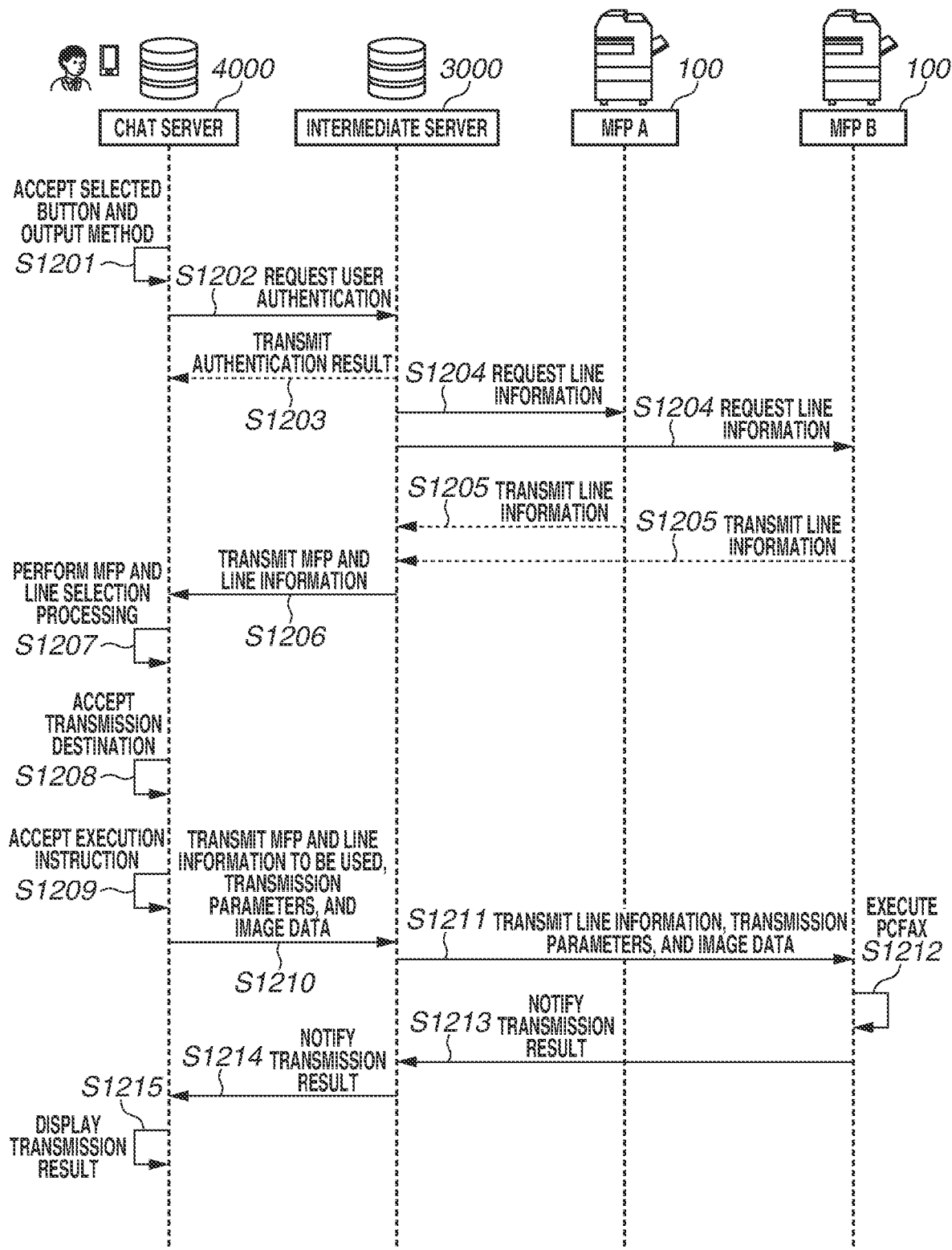
FIG. 12 is a sequence diagram illustrating an example of processing for executing PCFAX processing based on an instruction accepted in a chat room.

FIG. 12 is a sequence diagram illustrating an example of processing for executing the PCFAX based on an instruction accepted in the chat room. The sequence illustrated in FIG. 12 begins after the file 501 in FIG. 5 is posted.

After the file 501 is posted, the user selects the button 502 in the screen displayed on the mobile terminal 2007 and then selects the start bot button 505. Information based on the selected button is transmitted from the mobile terminal 2007 to the chat server 4000. In step S1201, the CPU 4001 accepts the information regarding the button selected on the mobile terminal 2007, and determines that the start bot button 505 is selected. The CPU 4001 also accepts information indicating that the selected output method for the file 501 is FAX.

In step S1202, the CPU 4001 transmits authentication information (a user ID and a password) of the user who selected the start bot button 505 and an authentication request to the intermediate server 3000 via the network I/F 4007.

In step S1203, the chat server 4000 receives an authentication result from the intermediate server 3000 and confirms whether authentication is successful. The remaining discussion of FIG. 12 is based on the premise that the authentication result indicates that authentication was successful.

In step S1204, since the authentication was successful, the CPU 3001 transmits, via the network I/F 3003, a request for line information to an MFP 100 included in the registered MFP data 3006 registered beforehand in the intermediate server 3000. For example, in a case where an MFP A and the MFP B are included, the request for line information is transmitted to both MFPs.

In step S1205, the CPU 3001 receives, via the network I/F 3003, the line information from the MFP 100 to which the request for the line information has been transmitted.

In step S1206, the CPU 3001 transmits, via the network I/F 3003, information about the MFP 100 registered in the registered MFP data 3006 and the line information of the MFP 100.

In step S1207, the CPU 4001 generates screen data for displaying an object, such as the button 604, in the chat room screen, based on the MFP information and the line information received in step S1206, and transmits the generated screen data to the mobile terminal 2007. When an MFP 100 and a line are selected by the user in the screen displayed on the touch panel of the mobile terminal 2007 based on the screen data, information about the MFP 100 and the line selected at the mobile terminal 2007 is transmitted to the chat server 4000. The CPU 4001 receives, via the network I/F 4007, the information about the MFP 100 and the line selected at the mobile terminal 2007.

In step S1208, the CPU 4001 executes processing for accepting a transmission destination. Specifically, the CPU 4001 generates screen data for displaying the message 701, the button 702, and the button 703 in the chat room screen 700 illustrated in FIG. 7, and transmits the generated screen data to the mobile terminal 2007. When the telephone number of a transmission destination is designated by the user in the screen displayed on the touch panel of the mobile terminal 2007 based on the screen data, the telephone number of the transmission destination designated at the mobile terminal 2007 is transmitted to the chat server 4000. The CPU 4001 receives, via the network I/F 4007, the telephone number of the transmission destination from the mobile terminal 2007. Settings for fax transmission can also be accepted here.

In step S1209, the CPU 4001 executes processing for accepting an execution instruction. Specifically, the CPU 4001 generates screen data for displaying the button 708 in the chat room screen 700 illustrated in FIG. 7, and transmits the generated screen data to the mobile terminal 2007. When the button 708 is selected by the user in the screen displayed on the touch panel of the mobile terminal 2007 based on the screen data, an execution instruction is transmitted from the mobile terminal 2007 to the chat server 4000.

In step S1210, upon accepting the execution instruction in step S1209, the CPU 4001 transmits, via the network I/F 4007, the MFP information and the line information accepted in step S1207, the information (telephone number) of the transmission destination accepted in step S1208, and a file (image data) corresponding to the button selected in step S1201, to the intermediate server 3000. In this processing, parameters, such as the transmission settings, are also transmitted in addition to the information of the destination.

In step S1211, based on the MFP information received in step S1210, the CPU 3001 determines an MFP 100 to which the parameters are to be transmitted, and transmits, via the network I/F 3003, the line information, the information of the transmission destination, and the file that have been received in step S1210 to the MFP 100.

In step S1212, the MFP 100 converts the file received in step S1211 into data that can be transmitted by fax, and transmits the data by fax to the received information (telephone number) of the transmission destination. The transmission settings used in this fax transmission can be transmission settings set at the mobile terminal 2007 and received via the chat server 4000, or can be transmission settings set on the control panel 209 of the MFP 100. Line information of a sender of this fax transmission is the line information received in step S1211.

In step S1213, the CPU 201 of the MFP 100 transmits, via the network I/F 218, information indicating the transmission result of the fax transmission processing to the intermediate server 3000.

In step S1214, the CPU 3001 transmits, via the network I/F 3003, the information indicating the transmission result received in step S1213 to the chat server 4000.

In step S1215, to display the information indicating the transmission result received in step S1214, as in the chat room screen 800 in FIG. 8, the CPU 4001 causes the chat bot to post the message 801 and transmits the screen data thereof to the mobile terminal 2007.

In the present exemplary embodiment, the image data, the transmission parameters, the line information, and the like are transmitted from the chat server 4000 to the MFP 100 via the intermediate server 3000. In another exemplary embodiment, the image data, the transmission parameters, the line information, and the like can be directly transmitted from the chat server 4000 to the MFP 100. In other words, the above-described processing can be executed without the intermediate server 3000. In this case, the MFP 100 performs the processing of the intermediate server 3000.

[Processing by Intermediate Server in Main Processing Sequence]

Figure 13:
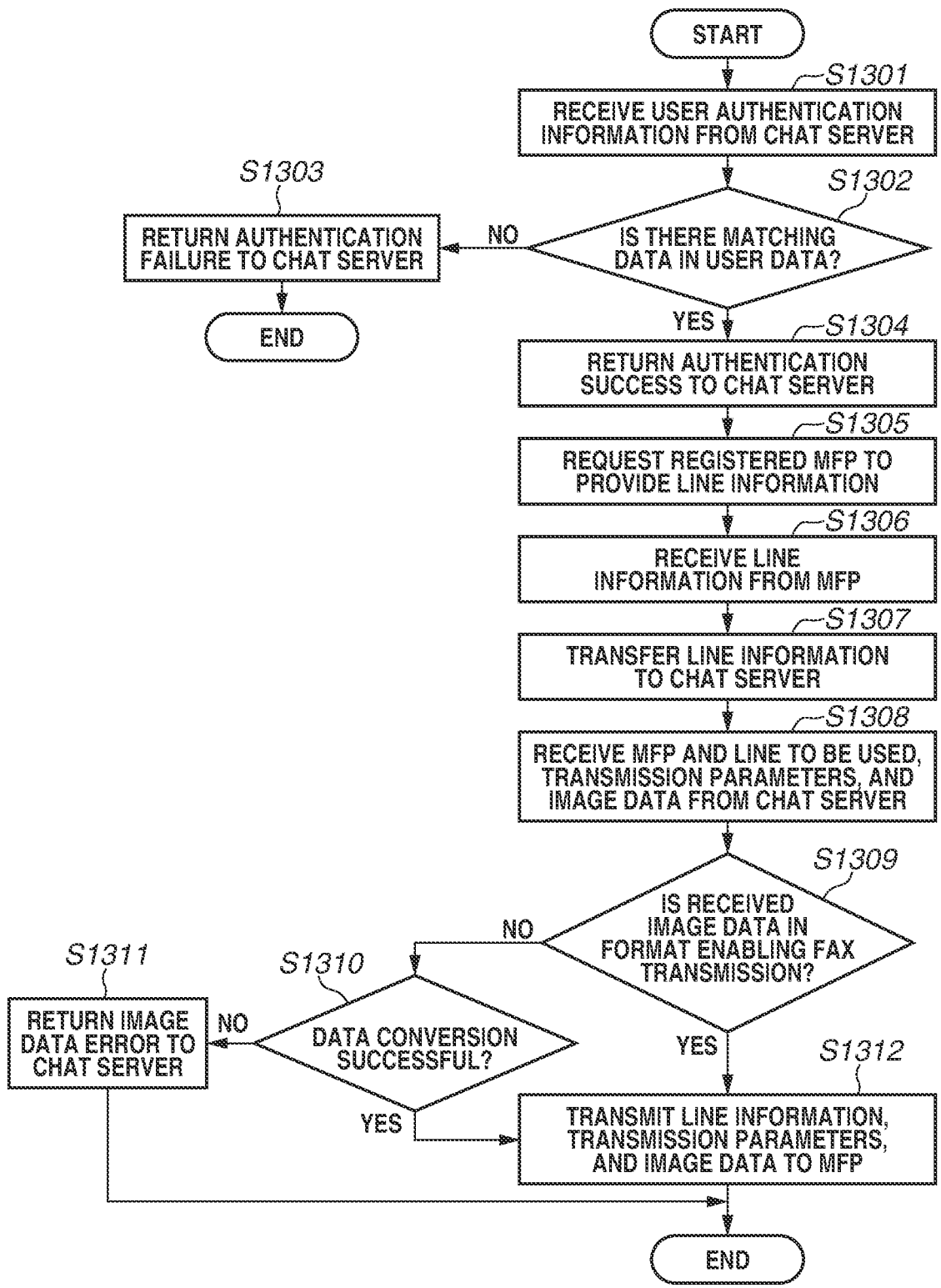
FIG. 13 is a flowchart illustrating an example of processing in the intermediate server before MFP and line selection processing.

FIG. 13 is a flowchart illustrating an example of the processing in the intermediate server 3000 before the MFP and line selection processing. More specifically, the processing flow of FIG. 13 reflects the processing performed in the intermediate server 3000 in the processing sequence of FIG. 12.

In step S1301, the intermediate server 3000 receives the user authentication information (the user ID and the password) from the chat server 4000. In step S1302, the intermediate server 3000 determines whether there is data matching the received user authentication information in the registered user data 3005 saved in the storage unit 3002 of the intermediate server 3000. In a case where there is no matching data (NO in step S1302), the processing proceeds to step S1303. In step S1303, the intermediate server 3000 returns an authentication failure to the chat server 4000, and the processing ends. In a case where there is matching data (YES in step S1302), the processing proceeds to step S1304. In step S1304, the intermediate server 3000 returns an authentication success. Next, in step S1305, the intermediate server 3000 requests the registered MFP to provide the line information. In step S1306, the intermediate server 3000 receives the line information from each MFP. In step S1307, the intermediate server 3000 transfers the received line information to the chat server 4000. In step S1308, the intermediate server 3000 receives the information about the MFP and the line to be used, the transmission parameters such as the transmission destination, and the image data from the chat server 4000, so that the MFP and the line to be used in the PCFAX transmission are determined.

In step S1309, the intermediate server 3000 checks the format of the image data received in step S1308, and determines whether the image data is in a format (e.g., Joint Bi-level Image Experts Group (JBIG)) that enables fax transmission. In a case where the image data is not in the format that enables fax transmission (NO in step S1309), the intermediate server 3000 converts the image data into image data in the format that enables fax transmission, and the processing proceeds to step S1310. In step S1310, the intermediate server 3000 determines whether the conversion is successful. In a case where the conversion is not successful (NO step S1310), the processing proceeds to step S1311. In step S1311, the intermediate server 3000 returns an original document data error to the chat server 4000, and the processing ends. In a case where the image data is in the format that enables fax transmission (YES in step S1309), or in a case where the conversion into image data in the format that enables fax transmission is successful (YES in step S1310), the processing proceeds to step S1312. In step S1312, the intermediate server 3000 transmits the line information, the transmission parameters, and the image data to the MFP.

[Destination Selection Processing Sequence]

Figure 14:
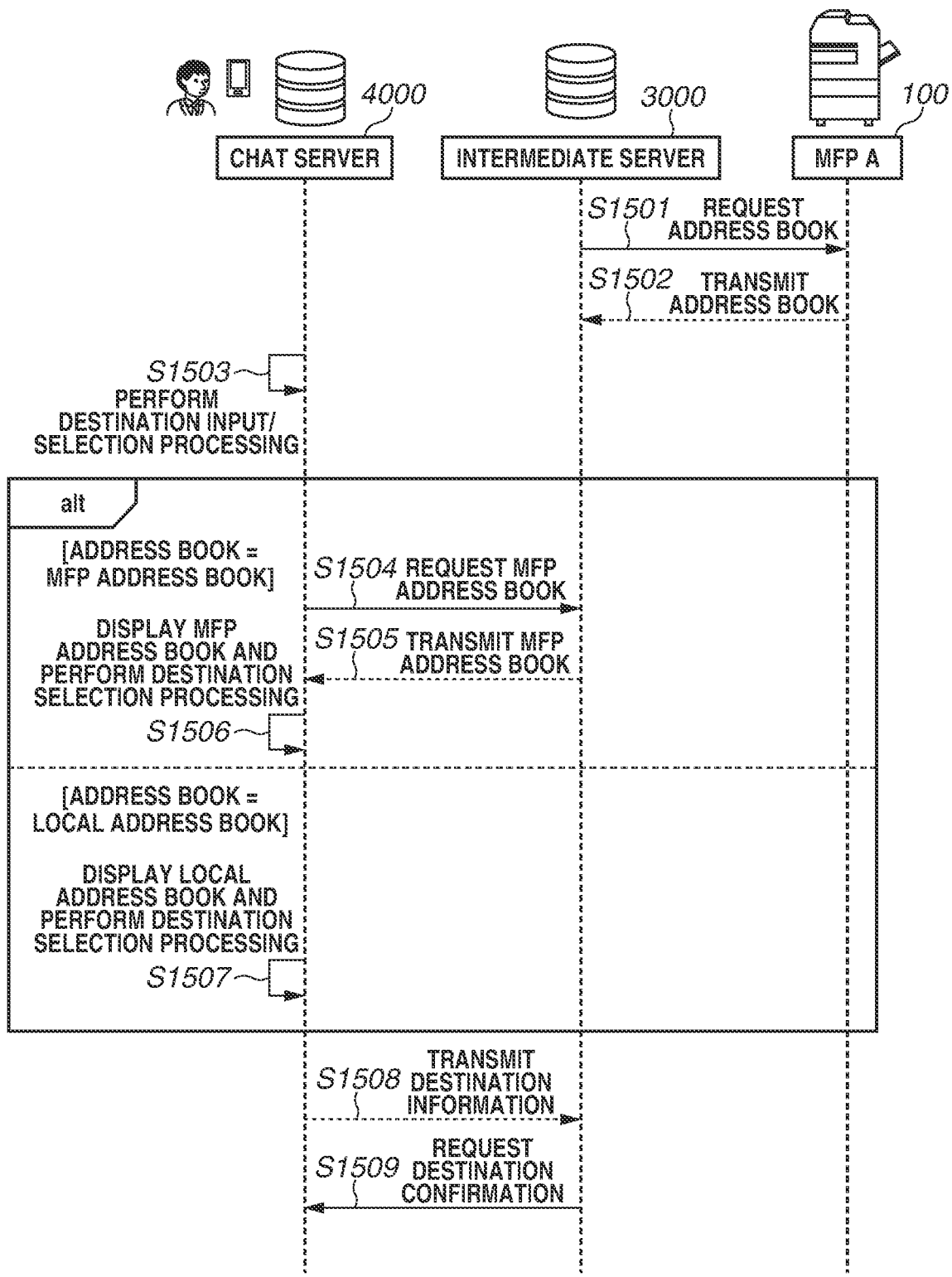
FIG. 14 is a sequence diagram illustrating an example of destination selection processing.

FIG. 14 is a sequence diagram illustrating an example of destination selection processing. The sequence illustrated in FIG. 14 indicates an example of the processing when the destination is selected from the MFP address book in step S1208.

In step S1501, the intermediate server 3000 requests the MFP 100 to provide the address book data. Then, in step S1502, the MFP 100 transmits the address book data to the intermediate server 3000.

Upon starting the processing in step S1208, the chat server 4000 executes destination input/selection processing in step S1503. In a case where the user selects the button 702 (selection from the MFP address book) in step S1503, in step S1504, the chat server 4000 requests the intermediate server 3000 to provide the MFP address book data. In step S1505, upon receiving the request for the address book data, the intermediate server 3000 temporarily saves the request into the address book data 3007 of the storage unit 3002, and transmits the address book data 3007 to the chat server 4000. In step S1506, upon receiving the address book data, the chat server 4000 causes the chat application to display the received address book for selection by the user. In a case where the user selects the button 703 in the destination input/selection processing in step S1503, in step S1507, the chat server 4000 causes the chat application to display the local address book of the mobile terminal 2007 for selection by the user. After the user selects the destination from the address book of the MFP 100 or the local address book of the mobile terminal 2007, in step S1508, the chat server 4000 transmits the selected information to the intermediate server 3000. In step S1509, in a case where the intermediate server 3000 determines that the received data is information selected from the address book, the intermediate server 3000 transmits the selected destination to the chat server 4000 for confirmation of the destination.

When the intermediate server 3000 transmits the address book data 3007 to the chat server 4000 in step S1505, the address data can be filtered. For example, the intermediate server 3000 can filter a range to be disclosed based on information (e.g., a user authority level) about the user authenticated in step S1203 in the address book data 3007, and transmit the filtered address book data.

In another exemplary embodiment, the above-described processing sequence can be implemented by the MFP 100 performing the function and role of the intermediate server 3000.

[Processing by Intermediate Server in Destination Selection Processing Sequence]

Figure 15:
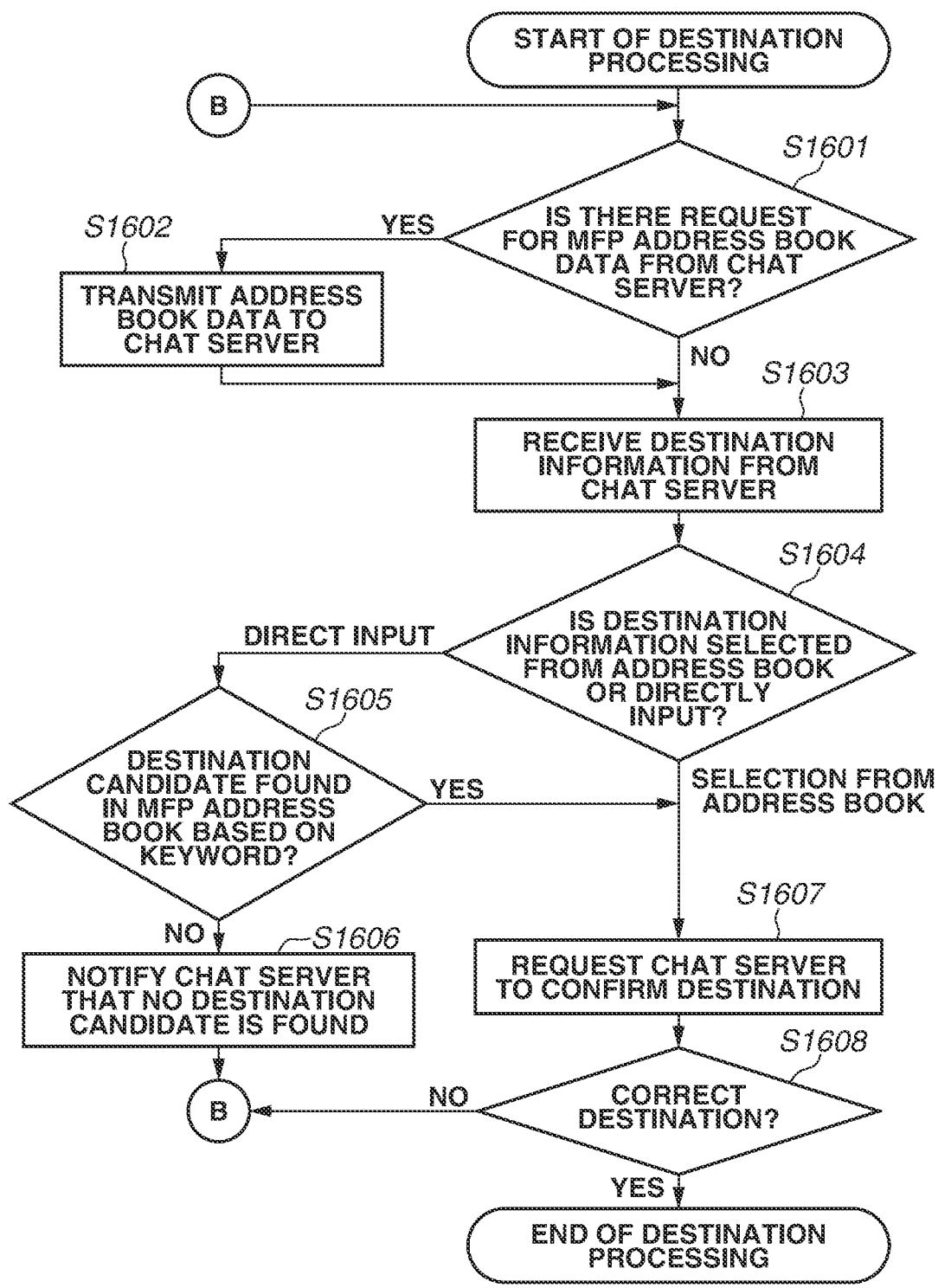
FIG. 15 is a flowchart illustrating an example of processing in the intermediate server in the destination selection processing.

FIG. 15 is a flowchart illustrating an example of the processing (destination processing) in the intermediate server 3000 in the destination selection processing with respect to the processing sequence described with reference to FIG. 14.

In step S1601, the intermediate server 3000 determines whether there is a request for the address book data of the MFP 100 from the chat server 4000. In a case where there is a request (YES in step S1601), the processing proceeds to step S1602. In step S1602, the intermediate server 3000 transmits the address book data 3007 of the MFP 100 to the chat server 4000. In a case where there is no request (NO in step S1601), the processing skips step 1602, and proceeds to step S1603. In step S1603, the intermediate server 3000 receives the destination information from the chat server 4000. In step S1604, the intermediate server 3000 determines whether the destination information is selected from the address book or directly input. In a case where the destination information is directly input, the processing proceeds to step S1605. In a case where the destination information is determined to be selected from the address book, the processing proceeds to step S1607. In step S1605, the intermediate server 3000 determines, based on a keyword of the input information, whether there is an applicable destination candidate in the address book data 3007 of the storage unit 3002. In a case where no destination candidate is found (NO in step S1605) as a result of the determination, the processing proceeds to step S1606. In step S1606, the intermediate server 3000 notifies the chat server 4000 that no destination candidate has not been found and the processing returns to step S1601 to repeat the processing. In a case where a destination candidate is found (YES in step S1605) as a result of the determination, the processing proceeds to step S1607. In step S1607, the intermediate server 3000 requests the chat server 4000 to confirm the destination. In step S1608, the intermediate server 3000 determines whether a response from the chat server 4000 indicates that the destination is correct. In a case where the response indicates that the destination is incorrect (NO in step S1608), the processing returns to step S1601 to repeat the processing. In a case where the response indicates that the destination is correct (YES in step S1608), the destination processing ends.

[Processing by Chat Server in Destination Selection Processing Sequence]

Figure 16:
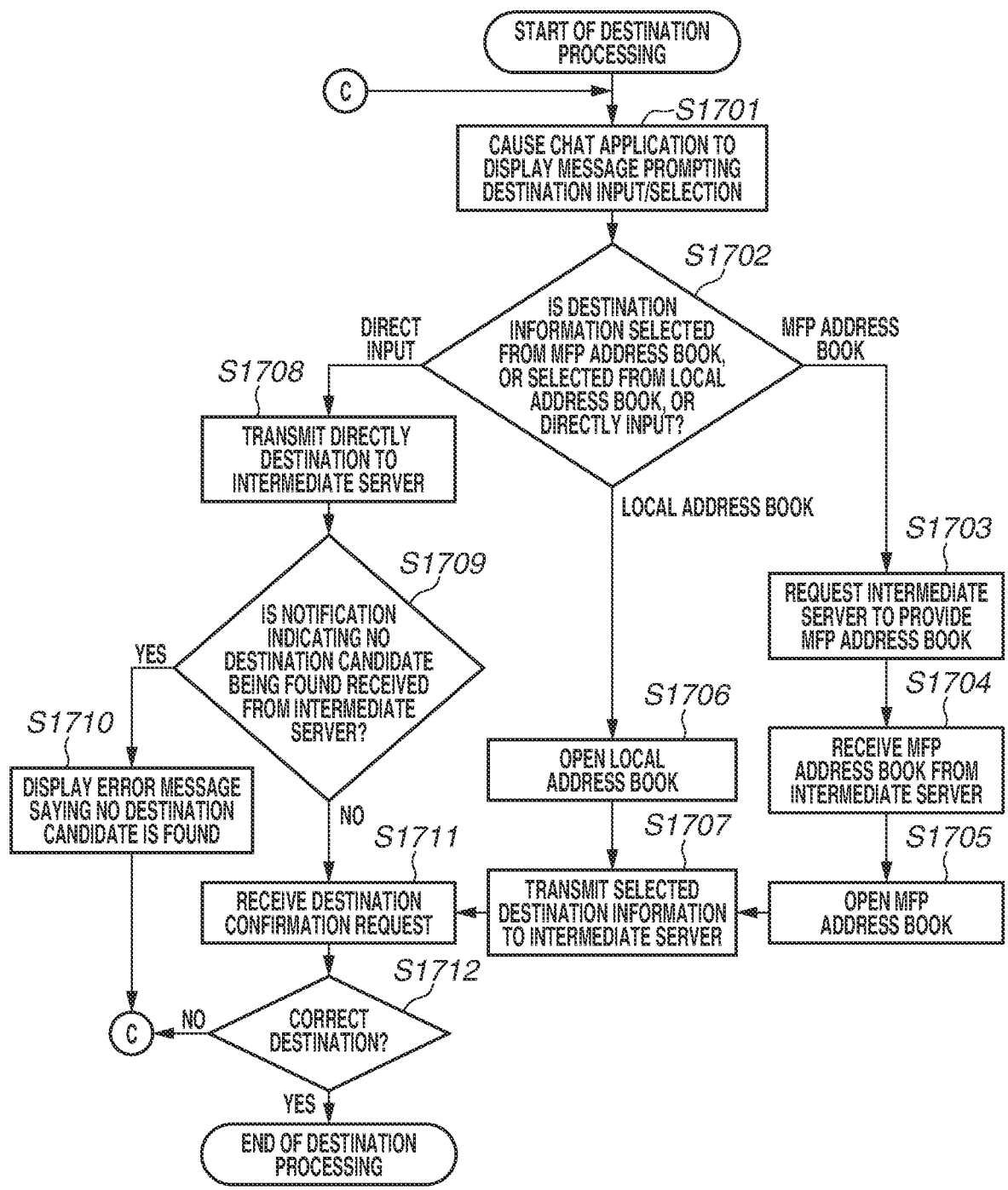
FIG. 16 is a flowchart illustrating processing in the chat server in the destination selection processing.

FIG. 16 is a flowchart illustrating the processing in the chat server 4000 in the destination selection processing with respect to the processing sequence described with reference to FIG. 14.

In step S1701, the chat server 4000 causes the chat application to display the message 701 for prompting destination input/selection. In step S1702, the chat server 4000 determines which action the user selected from selection of the button 702 (selection from the MFP address book), selection of the button 703 (selection from the local address book), or the direct input. In a case where the button 702 (selection from the MFP address book) is selected, the processing proceeds to step S1703. In step S1703, the chat server 4000 requests the intermediate server 3000 to provide the MFP address book. Then, in step S1704, the chat server 4000 receives the MFP address book. In step S1705, the chat server 4000 causes the chat application to display the received MFP address book, and the processing proceeds to step S1707, which is described below.

In a case where the button 703 (selection from the local address book of the mobile terminal 2007) is selected, the processing proceeds to step S1706. In step S1706, the chat server 4000 causes the chat application to display the local address book, and the processing proceeds to step S1707. In step S1707, upon accepting the selection of the destination by the user, the chat server 4000 transmits the selected destination information to the intermediate server 3000, and the processing proceeds to step S1711, which is described below.

In a case where the chat server 4000 determines that the action is the direct input in step S1702, the processing proceeds to step S1708. In step S1708, the chat server 4000 transmits the input data to the intermediate server 3000. In step S1709, the chat server 4000 determines whether a notification indicating that no destination candidate is found is received from the intermediate server 3000. In a case where the notification is received (YES in step S1709), the processing proceeds to step S1710. In step S1710, the chat server 4000 displays an error message (not illustrated) via the chat bot, and the processing returns to step S1701 to repeat the destination processing. In a case where the notification is not received (NO in step S1709), the processing proceeds to step S1711.

In step S1711, the chat server 4000 receives the destination confirmation request from the intermediate server 3000, and displays the message 705, the button 706 (YES), and the button 707 (NO) via the chat bot. In step S1712, the chat server 4000 determines whether the destination is correct. In a case where the user selects the button 707 (NO in step S1712), the chat server 4000 transmits a response indicating that the destination is incorrect to the intermediate server 3000, and the processing returns to step S1701 to repeat the destination processing. In a case where the button 706 is selected (YES in step S1712), the chat server 4000 transmits a response indicating that the destination is correct to the intermediate server 3000, and the destination processing ends.

Executing the above-described processing reduces the work of the user for transmitting the image data uploaded to the chat room of the chat service to the transmission destination using the PCFAX function.

Figure 17:
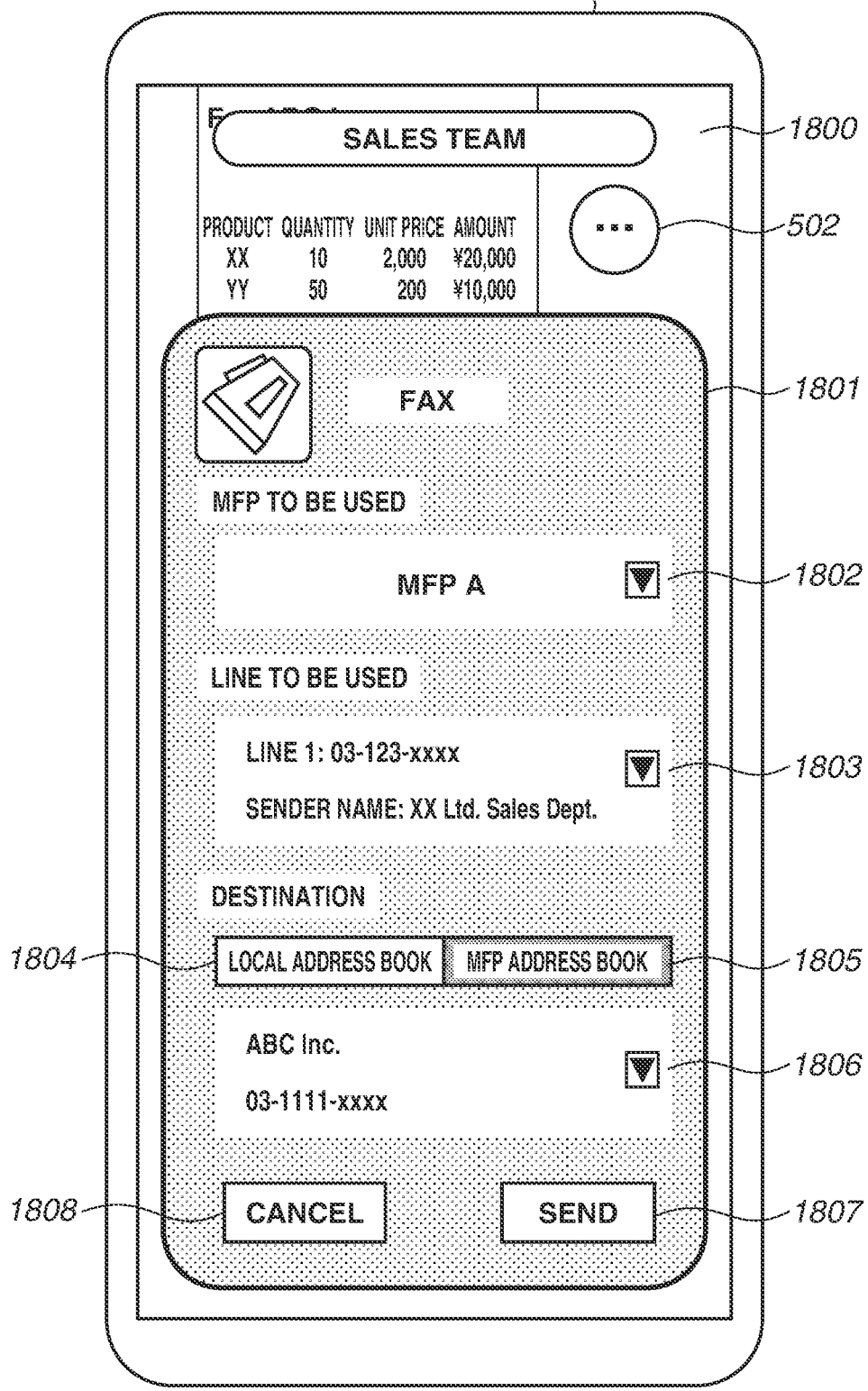
FIG. 17 is a diagram illustrating an example of a chat room screen.

FIG. 17 is a diagram illustrating an example of a chat room screen 1800. An application menu screen 1801 is displayed on the chat room screen 1800, by selecting the button 502 and then selecting the button 506 illustrated in FIG. 5. A pull-down menu 1802 is a menu for selecting an MFP to be used as a fax apparatus, where the user can select the MFP from the list of MFPs registered in the intermediate server 3000.

A pull-down menu 1803 is a menu for selecting a line to be used in fax processing, where the user can select a predetermined line from lines corresponding to the MFP selected in the pull-down menu 1802. In a case where no MFP is selected in the pull-down menu 1802, a predetermined line can be selected from lines corresponding to all the MFPs registered in the intermediate server 3000.

Buttons 1804 and 1805 are provided to select the local address book (the address book of the mobile terminal 2007) or the address book of the MFP selected in the pull-down menu 1802 as the address book to be referred to in selecting the transmission destination for the fax transmission. In the example illustrated in FIG. 17, the address book of the MFP is selected.

A pull-down menu 1806 is a menu for selecting a transmission destination for the fax transmission, where the user can select a predetermined destination from destinations (telephone numbers) included in the address book selected using the button 1804 or the button 1805. The pull-down menu 1806 can also be an entry field that enables the user to input a telephone number using a keyboard.

A button 1807 is provided to transmit a PCFAX execution instruction, and is similar to the button 708 illustrated in FIG. 7. Another pull-down menu (not illustrated) for setting parameters (including a transmission method (e.g., G3) and a resolution) for the fax transmission can be provided so that fax transmission parameters can be set. A button 1808 is provided to cancel the setting for PCFAX.

As described above, the screen dedicated to the extension application is displayed making it possible to provide an instruction for executing PCFAX without posting information irrelevant to the primary topic to the chat room.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-199143, filed Dec. 8, 2021, which is hereby incorporated by reference herein in its entirety.

What is claimed is:

1. An information processing apparatus that communicates with a fax apparatus and provides a chat service, the information processing apparatus comprising:
   a controller that accepts an execution instruction on a channel of the chat service; and
   a communicator that transmits, based on acceptance of the execution instruction, to the fax apparatus, an instruction for the fax apparatus to transmit image data uploaded to the channel of the chat service to a transmission destination and the image data.

2. A non-transitory storage medium storing a program to be executed by an information processing apparatus that communicates with a fax apparatus and provides a chat service, the program causing the information processing apparatus to:
   accept an execution instruction on a channel of the chat service; and
   transmit, based on acceptance of the execution instruction, to the fax apparatus, an instruction for the fax apparatus to transmit image data uploaded to the channel of the chat service to a transmission destination and the image data.

3. The non-transitory storage medium according to claim 2, wherein accepting the execution instruction comprises accepting selection of an object displayed on the channel.

4. The non-transitory storage medium according to claim 2, further comprising
   accepting a transmission setting on the channel,
   wherein, based on acceptance of the execution instruction, the instruction for the fax apparatus to transmit the image data uploaded to the channel of the chat service to the transmission destination, the image data, and the transmission setting are transmitted to the fax apparatus.

5. The non-transitory storage medium according to claim 2,
   accepting the transmission destination on the channel,
   wherein, based on acceptance of the execution instruction, the accepted transmission destination, the instruction for the fax apparatus to transmit the image data uploaded to the channel to the transmission destination, and the image data are transmitted to the fax apparatus.

6. The non-transitory storage medium according to claim 2, wherein the transmission destination is selected from an address book stored in the fax apparatus.

7. The non-transitory storage medium according to claim 2, further comprising posting information indicating a result of transmission of the image data by the fax apparatus to the channel.

8. The non-transitory storage medium according to claim 7, wherein, after the fax apparatus transmits the image data to the transmission destination, the information indicating the result of the transmission is posted to the channel without accepting an instruction from a user.

9. A method of controlling an information processing apparatus that communicates with a fax apparatus and provides a chat service, the method comprising:
   accepting an execution instruction on a channel of the chat service; and
   transmitting, based on acceptance of the execution instruction, to the fax apparatus, an instruction for the fax apparatus to transmit image data uploaded to the channel of the chat service to a transmission destination and the image data.

10. The method according to claim 9, wherein accepting the execution instruction comprises accepting selection of an object displayed on the channel.

11. The method according to claim 9, further comprising
   accepting a transmission setting on the channel,
   wherein, based on acceptance of the execution instruction, the instruction for the fax apparatus to transmit the image data uploaded to the channel of the chat service to the transmission destination, the image data, and the transmission setting are transmitted to the fax apparatus.

12. The method according to claim 9, further comprising accepting the transmission destination on the channel,
   wherein, based on acceptance of the execution instruction, the accepted transmission destination, the instruction for the fax apparatus to transmit the image data uploaded to the channel to the transmission destination, and the image data are transmitted to the fax apparatus.

13. The method according to claim 9, wherein the transmission destination is selected from an address book stored in the fax apparatus.

14. The method according to claim 9, further comprising posting information indicating a result of transmission of the image data by the fax apparatus to the channel.

15. The method according to claim 14, wherein, after the fax apparatus transmits the image data to the transmission destination, the information indicating the result of the transmission is posted to the channel without accepting an instruction from a user.

\* \* \* \* \*